(12) United States Patent
Miller et al.

(10) Patent No.: US 10,995,013 B2
(45) Date of Patent: May 4, 2021

(54) MIXED TRANSITION METAL TUNGSTATE

(71) Applicant: UOP LLC, Des Plaines, IL (US)

(72) Inventors: Stuart R. Miller, Arlington Heights, IL (US); Susan C. Koster, Carpentersville, IL (US); John P. S. Mowat, Arlington Heights, IL (US); Wharton Sinkler, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 253 days.

(21) Appl. No.: 16/189,501

(22) Filed: Nov. 13, 2018

(65) Prior Publication Data

US 2019/0185342 A1 Jun. 20, 2019

Related U.S. Application Data

(60) Provisional application No. 62/608,477, filed on Dec. 20, 2017.

(51) Int. Cl.
| | | |
|---|---|---|
| *C01G 53/00* | (2006.01) | |
| *B01J 23/888* | (2006.01) | |
| *B01J 23/80* | (2006.01) | |
| *C10G 45/08* | (2006.01) | |
| *B01J 37/20* | (2006.01) | |

(52) U.S. Cl.
CPC ............ *C01G 53/006* (2013.01); *B01J 23/80* (2013.01); *B01J 23/888* (2013.01); *B01J 37/20* (2013.01); *C10G 45/08* (2013.01); *C01P 2002/01* (2013.01); *C01P 2002/72* (2013.01); *C01P 2004/04* (2013.01)

(58) Field of Classification Search
CPC ........ C01G 53/006; C01G 45/08; B01J 23/80; B01J 23/888; B01J 37/20
See application file for complete search history.

(56) References Cited

U.S. PATENT DOCUMENTS

| | | |
|---|---|---|
| 4,820,677 A | 4/1989 | Jacobson et al. |
| 4,904,634 A | 2/1990 | Wieserman et al. |

(Continued)

FOREIGN PATENT DOCUMENTS

| | | |
|---|---|---|
| CA | 2719157 A1 | 10/2009 |
| CA | 2620656 C | 3/2014 |

(Continued)

OTHER PUBLICATIONS

Amaya, "Unsupported sulfides obtained from high specific area mixed oxides as hydrotreating catalysts", Revista Facultad de Ingenieria, Universidad de Antioquia (2010), 56, 58-67, Language: Spanish, Database: CAPLUS.

(Continued)

*Primary Examiner* — James A Fiorito
(74) *Attorney, Agent, or Firm* — Paschall & Associates LLC; James C. Paschall

(57) ABSTRACT

A unique crystalline mixed transition metal tungstate material has been developed material may be sulfided to generate metal sulfides which are used as a catalyst in a conversion process such as hydroprocessing. The hydroprocessing may include hydrodenitrification, hydrodesulfurization, hydrodemetallation, hydrodesilication, hydrodearomatization, hydroisomerization, hydrotreating, hydrofining, and hydrocracking.

16 Claims, 3 Drawing Sheets

(56) References Cited

U.S. PATENT DOCUMENTS

| | | |
|---|---|---|
| 5,278,121 A | 1/1994 | Singhal et al. |
| 6,156,695 A | 12/2000 | Soled et al. |
| 6,162,350 A | 12/2000 | Soled et al. |
| 6,197,273 B1 | 3/2001 | Nagano et al. |
| 6,280,610 B1 | 8/2001 | Uragami et al. |
| 6,299,760 B1 | 10/2001 | Soled et al. |
| 6,534,437 B2 | 3/2003 | Eijsbouts et al. |
| 6,582,590 B1 | 6/2003 | Riley et al. |
| 6,620,313 B1 | 9/2003 | Demmin et al. |
| 6,635,599 B1 | 10/2003 | Eijsbouts et al. |
| 6,652,738 B2 | 11/2003 | Eijsbouts et al. |
| 6,712,955 B1 | 3/2004 | Hou et al. |
| 6,783,663 B1 | 8/2004 | Riley et al. |
| 6,863,803 B1 | 3/2005 | Riley et al. |
| 6,929,738 B1 | 8/2005 | Riley et al. |
| 7,229,548 B2 | 6/2007 | Riley et al. |
| 7,232,515 B2 | 6/2007 | Demmin et al. |
| 7,232,934 B2 | 6/2007 | Saleh et al. |
| 7,288,182 B1 | 10/2007 | Soled et al. |
| 7,513,989 B1 | 4/2009 | Soled et al. |
| 7,538,066 B2 | 5/2009 | Soled et al. |
| 7,544,632 B2 | 6/2009 | Soled et al. |
| 7,591,942 B2 | 9/2009 | Soled et al. |
| 7,605,107 B2 | 10/2009 | Soled et al. |
| 7,608,558 B2 | 10/2009 | Eijsbouts et al. |
| 7,648,941 B2 | 1/2010 | Soled et al. |
| 7,686,943 B2 | 3/2010 | Soled et al. |
| 7,691,257 B2 | 4/2010 | Shih et al. |
| 7,709,412 B2 | 5/2010 | Shih et al. |
| 7,749,937 B2 | 7/2010 | Domokos et al. |
| 7,776,205 B2 | 8/2010 | Soled et al. |
| 7,780,845 B2 | 8/2010 | Soled et al. |
| 7,951,746 B2 | 5/2011 | Bai et al. |
| 8,062,508 B2 | 11/2011 | Soled et al. |
| 8,067,331 B2 | 11/2011 | Eijsbouts-Spickova et al. |
| 8,080,492 B2 | 12/2011 | Kuperman et al. |
| 8,173,570 B2 | 5/2012 | Maesen et al. |
| 8,206,575 B2 | 6/2012 | Maesen et al. |
| 8,216,958 B2 | 7/2012 | Wu et al. |
| 8,318,628 B2 | 11/2012 | Brun et al. |
| 8,343,887 B2 | 1/2013 | Maesen et al. |
| 8,377,289 B2 | 2/2013 | Li et al. |
| 8,383,543 B2 | 2/2013 | Maesen et al. |
| 8,586,500 B2 | 11/2013 | Kuperman et al. |
| 8,636,967 B2 | 1/2014 | Canelon et al. |
| 8,846,560 B2 | 9/2014 | Yang et al. |
| 2008/0280754 A1 | 11/2008 | Toledo Antonio et al. |
| 2009/0114566 A1 | 5/2009 | Chen et al. |
| 2009/0127165 A1* | 5/2009 | Eijsbouts-Spickova ............. B01J 37/0009 208/216 R |
| 2012/0065056 A1 | 3/2012 | Domokos et al. |
| 2012/0122653 A1 | 5/2012 | Maesen et al. |
| 2012/0122659 A1 | 5/2012 | Kuperman et al. |
| 2012/0172199 A1 | 7/2012 | Yang et al. |
| 2013/0068662 A1 | 3/2013 | Maesen et al. |
| 2013/0337996 A1 | 12/2013 | Eijsbouts-Spickova et al. |
| 2014/0027350 A1 | 1/2014 | Soled et al. |
| 2015/0292095 A1 | 10/2015 | Haber et al. |
| 2017/0165644 A1 | 6/2017 | Miller et al. |
| 2017/0165645 A1 | 6/2017 | Miller et al. |
| 2017/0165646 A1 | 6/2017 | Miller et al. |
| 2017/0165647 A1 | 6/2017 | Miller et al. |
| 2017/0165648 A1 | 6/2017 | Miller et al. |
| 2017/0165649 A1 | 6/2017 | Miller et al. |
| 2017/0165650 A1 | 6/2017 | Miller et al. |
| 2017/0165651 A1 | 6/2017 | Miller et al. |
| 2017/0165652 A1 | 6/2017 | Miller et al. |
| 2017/0165656 A1 | 6/2017 | Miller et al. |
| 2017/0166605 A1 | 6/2017 | Miller et al. |
| 2017/0218528 A1 | 8/2017 | Zhang et al. |
| 2018/0169633 A1 | 6/2018 | Millet et al. |
| 2019/0060873 A1 | 2/2019 | Millet et al. |
| 2019/0060882 A1 | 2/2019 | Miller et al. |

FOREIGN PATENT DOCUMENTS

| | | |
|---|---|---|
| CN | 102049265 A | 5/2011 |
| EP | 2103347 A1 | 9/2009 |
| RU | 2098181 C1 | 12/1997 |
| WO | 200042126 A1 | 7/2000 |
| WO | 2009061295 A1 | 5/2009 |
| WO | 2014033653 A2 | 3/2014 |

OTHER PUBLICATIONS

An, "Preparation of unsupported and mesoporous Ni—Mo—W sulfide catalysts by low temperature solid-state reaction", Journal of China University of Petroleum (Edition of Natural Science), v 31, n 6, p. 156-160, Dec. 2007, ISSN: 16735005; Publisher: Ed. Off. Journal of the Univ. Petroleum, China. Language: Chinese.

Calderon-Magdaleno, "Effect of the amount of citric acid used in the preparation of NiMo/SBA-15 catalysts on their performance in HDS of dibenzothiophene-type compounds", Catalysis Today, v 220-222, p. 78-88, Mar. 2014; ISSN: 09205861; DOI: 10.1016/j.cattod.2013.06.002; Publisher: Elsevier.

Escobar, "Effect of ethylene glycol addition on the properties of P-doped NiMo/Al2O3 HDS catalysts: Part I. Materials preparation and characterization", Applied Catalysis B: Environmental, v 88, n 3/4, p. 564-575, May 20, 2009; ISSN: 09263373; DOI: 10.1016/j.apcatb.2008.10.005; Publisher: Elsevier.

Gil-Llambias, "Hydrodesulfurization Catalysts Electrophoretic Study of Mo (or W)-Co, Mo (or W)-Ni, and Mo (or Jv)-Ca Sulfided Phases", J. Catal., v 102, n 1, p. 37-42, Nov. 1986; ISSN: 00219517; Publisher: Academic Press.

Levin, "Crystal Structure of an Ammonium Nickel Molybdate Prepared by Chemical Precipitation", Inorg. Chem. 1996, 35, 4191-4197.

Nava, "Effect of phosphorus addition on unsupported Ni—Mo—W sulfide catalysts prepared by the in situ activation of nickel/tetramethylammonium thiomolybdotungstate", Applied Catalysis A: General, v 303, n 2, p. 177-184, Apr. 28, 2006; ISSN: 0926860X; DOI: 10.1016/j.apcata.2005.12.025; Publisher: Elsevier.

Nikulshin, "Influence of nature of precursors of aluminum nickel molybdenum catalysts on their performance in hydrodesulfurization", Neftekhimiya, v46, n 5, p. 371-376, 2006; Language: Russian; ISSN: 00282421; Publisher: East View Publications.

Olivas, "Trimetallic NiMoW unsupported catalysts for HDS", ACS Division of Petroleum Chemistry, Inc. Preprints, v 50, n 4, p. 372-374, Aug. 2005; ISSN: 05693799; Publisher: American Chemical Society.

Yin, "A novel porous ammonium nickel molybdate as the catalyst precursor towards deep hydrodesulfurization of gas oil", p. 873-878, 2013, ISSN: 0016-2361, Publisher Elsevier Science.

Yin, "Mechanism of Hydrodesulfurization of dibenzothiophenes on unsupported NiMoW catalyst", Journal of Fuel Chemistry and Technology, v 41, n 8, p. 991-997, Aug. 2013; ISSN: 18725813; DOI: 10.1016/S1872-5813(13) 60043-2; Publisher: Science Press.

Zhang, "Solution synthesis of unsupported Ni—W—S hydrotreating catalysts", Catalysis Communications 8 (2007) 2232-2237.

Zhou, "Study on hydrodesulfurization process of diesel on unsupported catalyst", Petroleum Processing and Petrochemicals, v 44, n 10, p. 38-43, Oct. 2013; Language: Chinese; ISSN: 10052399; Publisher: Research Institute of Petroleum Processing, SINOPEC.

Clearfield, "Studies in Heavy-Metal Molybdates. I. Crystal Structure of a Basic Zinc Molybdate, NaZn2OH(H20) (Mo04)21a", Inorganic Chemistry, vol. 15, No. 2, 1976, 335-338.

Clearfield, "Preparation and Structure of Manganese Molybdates", Inorg. Chem. 1985, 24, 4606-4609.

Clearfield, "Studies in Heavy-Metal Molybdates. 2. Crystal Structure of Disodium Di-u-hydroxo-dizin(II) Molybdate", Inorganic Chemistry, vol. 16, No. 3, 1977, 628-631.

Duan, "Ternary Ni—Co—Mo oxy-hydroxide nanoflakes grown on carbon cloth for excellent supercapacitor electrodes", Materials Letters 208 (2017) 65-68.

(56) References Cited

OTHER PUBLICATIONS

Hsu, "Synthesis and characterization of mesoporous Ni—Co oxy-hydroxides for pseudocapacitor application", Electrochimica Acta 94 (2013) 104-112.

Lien, "High-performance asymmetric supercapacitor consisting of Ni—Co—Cu oxy-hydroxide nanosheets and activated carbon", Electrochemistry Communications 34 (2013) 323-326.

Xiao, "Remarkable improvement of the turn-on characteristics of a Fe2O3 photoanode for photoelectrochemical water splitting with coating a FeCoW oxy-hydroxide gel", Applied Catalysis B: Environmental 212 (2017) 89-96.

U.S. Appl. No. 16/189,057 Crystalline Oxy-Hydroxide Transition Metal Molybdotungstate, Millet et al. filed Nov. 13, 2018.

U.S. Appl. No. 16/206,837 Highly Active Quaternary Metallic Materials Using Short-Chain Alkyl Quaternary Ammonium Compounds, Osman et al. filed Nov. 30, 2018.

U.S. Appl. No. 16/206,924 Chighly Active Quaternary Metallic Materials Using Short-Chain Alkyl Quaternary Ammonium Compounds, Osman et al. filed Nov. 30, 2018.

U.S. Appl. No. 16/198,613 Highly Active Trimetallic Materials Using Short-Chain Alkyl Quaternary Ammonium Compounds, Pan et al. filed Nov. 21, 2018.

U.S. Appl. No. 16/206,804 Highly Active Trimetallic Materials Using Short-Chain Alkyl Quaternary Ammonium Compounds, Osman et al. filed Nov. 30, 2018.

U.S. Appl. No. 16/206,867 Highly Active Quaternary Metallic Materials Using Short-Chain Alkyl Quaternary Ammonium Compounds, Osman et al. filed Nov. 30, 2018.

U.S. Appl. No. 16/206,898 Highly Active Multimetallic Materials Using Short-Chain Alkyl Quaternary Ammonium Compounds, Osman et al. filed Nov. 30, 2018.

\* cited by examiner

MIXED TRANSITION METAL TUNGSTATE

CROSS-REFERENCE TO RELATED APPLICATIONS

This application claims priority from U.S. Provisional Application No. 62/608,477 filed Dec. 20, 2017, the contents of which cited application are hereby incorporated by reference in its entirety.

FIELD OF THE INVENTION

This invention relates to a new hydroprocessing catalyst. More particularly this invention relates to a novel crystalline oxy-hydroxide mixed transition metal tungstate and its use as a hydroprocessing catalyst. Hydroprocessing may include hydrodenitrification, hydrodesulfurization, hydrodemetallation, hydrodesilication, hydrodearomatization, hydroisomerization, hydrotreating, hydrofining, and hydrocracking.

BACKGROUND

In order to meet the growing demand for petroleum products there is greater utilization of sour crudes, which when combined with tighter environmental legislation regarding the concentration of nitrogen and sulfur within fuel, leads to accentuated refining problems. The removal of sulfur (hydrodesulfurization—HDS) and nitrogen (hydrodenitrification—HDN) containing compounds from fuel feed stocks is targeted during the hydrotreating steps of refining and is achieved by the conversion of organic nitrogen and sulfur to ammonia and hydrogen sulfide respectively.

Since the late 1940s the use of catalysts containing nickel (Ni) and molybdenum (Mo) or tungsten (W) have demonstrated up to 80% sulfur removal. See for example, V. N. Ipatieff, G. S. Monroe, R. E. Schaad, Division of Petroleum Chemistry, 115$^{th}$ Meeting ACS, San Francisco, 1949. For several decades now there has been an intense interest directed towards the development of materials to catalyze the deep desulfurization, in order to reduce the sulfur concentration to the ppm level. Some recent breakthroughs have focused on the development and application of more active and stable catalysts targeting the production of feeds for ultra low sulfur fuels. Several studies have demonstrated improved HDS and HDN activities through elimination of the support such as, for example, $Al_2O_3$. Using bulk unsupported materials provides a route to increase the active phase loading in the reactor as well as providing alternative chemistry to target these catalysts.

More recent research in this area has focused on the ultra deep desulfurization properties achieved by a Ni—Mo/W unsupported 'trimetallic' material reported in, for example, U.S. Pat. No. 6,156,695. The controlled synthesis of a broadly amorphous mixed metal oxide consisting of molybdenum, tungsten and nickel, significantly outperformed conventional hydrotreating catalysts. The structural chemistry of the tri-metallic mixed metal oxide material was likened to the hydrotalcite family of materials, referring to literature articles detailing the synthesis and characterization of a layered nickel molybdate material, stating that the partial substitution of molybdenum with tungsten leads to the production of a broadly amorphous phase which, upon decomposition by sulfidation, gives rise to superior hydrotreating activities.

The chemistry of these layered hydrotalcite-like materials was first reported by H. Pezerat, contribution à l'étude des molybdates hydrates de zinc, cobalt et nickel, C. R. Acad. Sci., 261, 5490, who identified a series of phases having ideal formulas $MMoO_4.H_2O$, $EHM_2O^-(MoO_4)_2.H_2O$, and $E_{2-x}(H_3O)_xM_2O(MoO_4)_2$ where E can be $NH_4^+$, $Na^+$ or $K^+$ and M can be $Zn^{2+}$, $Co^{2+}$ or $Ni^{2+}$.

Pezerat assigned the different phases he observed as being Φc, Φx or Φy and determined the crystal structures for Φx and Φy, however owing to a combination of the small crystallite size, limited crystallographic capabilities and complex nature of the material, there were doubts raised as to the quality of the structural assessment of the materials. During the mid 1970s, Clearfield et al attempted a more detailed analysis of the Φx and Φy phases, see examples A. Clearfield, M. J. Sims, R. Gopal, Inorg. Chem., 15, 335; A. Clearfield, R. Gopal, C. H. Saldarriaga-Molina, Inorg. Chem., 16, 628. Single crystal studies on the product from a hydrothermal approach allowed confirmation of the Φx structure, however they failed in their attempts to synthesize Φy and instead synthesized an alternative phase, Na—Cu(OH)($MoO_4$), see A. Clearfield, A. Moini, P. R. Rudolf, Inorg. Chem., 24, 4606.

The structure of Φy was not confirmed until 1996 by Ying et al. Their investigation into a room temperature chimie douce synthesis technique in the pursuit of a layered ammonium zinc molybdate led to a metastable aluminum-substituted zincite phase, prepared by the calcination of Zn/Al layered double hydroxide ($Zn_4Al_2(OH)_{12}CO_3.zH_2O$). See example D. Levin, S. L. Soled, J. Y. Ying, Inorg. Chem., 1996, 35, 4191-4197. This material was reacted with a solution of ammonium heptamolybdate at room temperature to produce a highly crystalline compound, the structure of which could not be determined through conventional ab-initio methods. The material was indexed, yielding crystallographic parameters which were the same as that of an ammonium nickel molybdate, reported by Astier, see example M. P. Astier, G. Dji, S. Teichner, J. Ann. Chim. (Paris), 1987, 12, 337, a material belonging to a family of ammonium-amine-nickel-molybdenum oxides closely related to Pezerat's materials. Astier did not publish any detailed structural data on this family of materials, leading to Ying et al reproducing the material to be analyzed by high resolution powder diffraction in order to elucidate the structure. Ying et al named this class of materials 'layered transition-metal molybdates' or LTMs.

Since the initial reports of unsupported Ni—Mo/W oxidic precursors, U.S. Pat. No. 6,156,695, there have been several reports describing materials which, when sulfided, claim to have enhanced hydrotreating activities. U.S. Pat. No. 6,534,437 discloses a process for preparing a mixed metal catalyst having a powder x-ray diffraction pattern showing reflections at approximately 2.53 Angstroms and 1.70 angstroms. U.S. Pat. No. 6,534,437 differentiates itself from U.S. Pat. No. 3,678,124 and WO 9903578 based on characteristic full width half maximum line widths of more resolved reflections, present in WO 9903578, claiming that the invention of U.S. Pat. No. 6,534,437 possesses a 'different microstructure' from prior work, WO 9903578.

U.S. Pat. No. 8,722,563 describes preparing a series of catalyst precursors with compositions comprising at least one Group VI metal and one metal from Group VIII through Group X. One of the comparative examples described in the patent yields a comparable powder x-ray diffraction pattern to that obtained in U.S. Pat. No. 6,534,437 and is described as the as-synthesized and dried hexagonal $NiWO_4$ catalyst precursor.

U.S. Pat. No. 7,648,941 discloses synthetic examples of a series of different bimetallic materials and states that the bulk bimetallic catalyst of the invention has a metastable structure and further assert that the crystalline 2θ structure of the metastable hexagonal NiWO$_4$ phase in the preferred catalysts of the invention have lattice parameters a=2.92 Å, b=2.93 Å, and c=4.64 Å and that bulk catalyst has a metastable hexagonal structure having an X-ray diffraction pattern with a single reflection between 58 and 65°. As a point of reference, the largest two d-spacings which can be generated in an x-ray diffraction pattern by a hexagonal cell with lattice parameters a=2.92 Å, b=2.93 Å, and c=4.64 Å are 4.64 Å and 2.53 Å.

A. Dias and V. S. T. Ciminelli, *J. Eur. Ceramic. Soc,* 2001, 21, 2061-2065 reported on the thermodynamic calculations and modeling of hydrothermally synthesized nickel tungstates. They present a series of calculated yield diagrams at various synthesis temperatures highlighting the pH and reagent concentrations which yield NiWO$_4$. All of their calculations predict the formation of a nickel tungstate between pH 2 and 7.5, with nickel hydroxide being the main product at higher pH's. The authors show the x-ray diffraction patterns for the samples produced at 200, 230 and 260° C. within and without their predicted yield zones. The x-ray diffraction pattern for the NiWO$_4$ material synthesized at 200° C. can be described as poorly crystalline and the reference asserts that it is important to note that a crystallized material was obtained at 200° C., but with extremely fine particle size indicated by broad X-ray diffraction peaks. The reference asserts this can be explained by the energy barrier for the precipitation, which is closely related to the nature of the rate-controlling step in the dominant formation process. The reference puts forth that higher reaction temperatures accelerate the crystallization process because of greater thermal energy to overcome the energy barrier for transformation, and a consequence, materials with higher crystallinity and/or particle size can be obtained. The reference suggests that the phase obtained at 200° C. is essentially a poorly crystalline, nano-wolframite (NiWO$_4$), and this conclusion is consistent with calculated yield diagrams of the reference.

Y. Bi, H. Nie, D. Li, S. Zeng, Q. Yang and M. Li, Chemical Communications, 2010, 46, 7430-7432 discuss the preparation of NiWO$_4$ nanoparticles as a promising hydrodesulfurization catalyst, stating that all the reflections in a typical powder x-ray diffraction pattern can be indexed undisputedly to the monoclinic NiWO$_4$, Wolframite, phase. The reference asserts that FIG. 1 shows the typical X-ray diffraction (XRD) pattern of the as-made sample and all reflections can be indexed undisputedly to the monoclinic NiWO$_4$ phase (JCPDS card 72-1189). The reference concludes that a close examination reveals that the reflections in the XRD pattern are a little broad, indicating the characteristic feature of nanosized materials.

SUMMARY OF THE INVENTION

A novel crystalline mixed transition metal tungstate material has been produced and optionally sulfided, to yield an active hydroprocessing catalyst. The novel crystalline mixed transition metal tungstate material has a unique x-ray powder diffraction pattern showing peaks at 7.54, 4.6, 2.51 and 1.7 Å. The novel crystalline mixed transition metal tungstate material has the formula:

$$Ni_xM_{(1-x)}(OH)_aW_yO_z$$

where 'M' is a metal selected from Mn, Fe, Co, V, Cu, Zn and mixtures thereof; 'x' varies from 0.001 to 0.9999, or from 0.01 to 0.7, or from 0.1 to 0.3; 'a' varies from 0.001 to 2; 'y' varies from 0.3 to 1.2, or from 0.45 to 1, or from 0.5 to 0.9; 'z' is a number which satisfies the sum of the valences of Ni, M, W; the material is further characterized by a unique x-ray powder diffraction pattern showing peaks at the d-spacings listed in Table A:

TABLE A

| d(Å) | I/I$_0$ (%) |
|------|-------------|
| 7.54 | w-m |
| 4.6 | s |
| 3.87 | s |
| 2.92 | s |
| 2.51 | vs |
| 1.7 | vs |
| 1.63 | m |

Another embodiment involves a method of making a novel crystalline mixed transition metal tungstate material having the formula:

$$Ni_xM_{(1-x)}(OH)_aW_yO_z$$

where 'M' is a metal selected from Mn, Fe, Co, V, Cu, Zn and mixtures thereof; 'x' varies from 0.001 to 0.9999, or from 0.01 to 0.7, or from 0.1 to 0.3; 'a' varies from 0.001 to 2; 'y' varies from 0.3 to 1.2, or from 0.45 to 1, or from 0.5 to 0.9; 'z' is a number which satisfies the sum of the valences of Ni, M, W; the material is further characterized by a unique x-ray powder diffraction pattern showing peaks at the d-spacings listed in Table A:

TABLE A

| d(Å) | I/I$_0$ (%) |
|------|-------------|
| 7.54 | w-m |
| 4.6 | s |
| 3.87 | s |
| 2.92 | s |
| 2.51 | vs |
| 1.7 | vs |
| 1.63 | m | the method comprising of forming an aqueous reaction solution containing sources of Ni, M and W; and adding using NH$_4$OH to yield a pH of from about 6.5 to about 10 prior to reacting the mixture together at elevated temperatures in an open or sealed vessel and then recovering the novel crystalline mixed transition metal tungstate material.

Yet another embodiment involves a conversion process comprising contacting a feed with a catalyst at conversion conditions to give at least one product, the catalyst comprising: a novel crystalline mixed transition metal tungstate material having the formula:

$$Ni_xM_{(1-x)}(OH)_aW_yO_z$$

where 'M' is a metal selected from Mn, Fe, Co, V, Cu, Zn and mixtures thereof; 'x' varies from 0.001 to 0.9999, or from 0.01 to 0.7, or from 0.1 to 0.3; 'a' varies from 0.001 to 2; 'y' varies from 0.3 to 1.2, or from 0.45 to 1, or from 0.5 to 0.9; 'z' is a number which satisfies the sum of the valences of Ni, M, W; the material is further characterized by a unique x-ray powder diffraction pattern showing peaks at the d-spacings listed in Table A:

TABLE A

| d(Å) | I/I$_0$ (%) |
|---|---|
| 7.54 | w-m |
| 4.6 | s |
| 3.87 | s |
| 2.92 | s |
| 2.51 | vs |
| 1.7 | vs |
| 1.63 | m |

Additional features and advantages of the invention will be apparent from the description of the invention, figures and claims provided herein.

DETAILED DESCRIPTION OF THE INVENTION

The present invention relates to a novel crystalline mixed transition metal tungstate composition and a process for preparing the composition. The material has the designation UPM-3. This composition has an empirical formula:

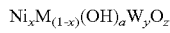

where 'M' is a metal selected from Mn, Fe, Co, V, Cu, Zn and mixtures thereof; 'x' varies from 0.001 to 0.9999, or from 0.01 to 0.7, or from 0.1 to 0.3; 'a' varies from 0.001 to 2; 'y' varies from 0.3 to 1.2, or from 0.45 to 1, or from 0.5 to 0.9; 'z' is a number which satisfies the sum of the valences of Ni, M, W.

The crystalline composition of the invention is characterized by having an extended network of M-O-M, where M represents a metal, or combination of metals listed above. The structural units repeat itself into at least two adjacent unit cells without termination of the bonding. The composition can have a one-dimensional network, such as, for example, linear chains.

The novel crystalline mixed transition metal tungstate composition is further characterized by a unique x-ray powder diffraction pattern showing peaks at the d-spacings listed in Table A.

TABLE A

| d(Å) | I/I$_0$ (%) |
|---|---|
| 7.54 | w-m |
| 4.6 | s |
| 3.87 | s |
| 2.92 | s |
| 2.51 | vs |
| 1.7 | vs |
| 1.63 | m |

Figure 1:
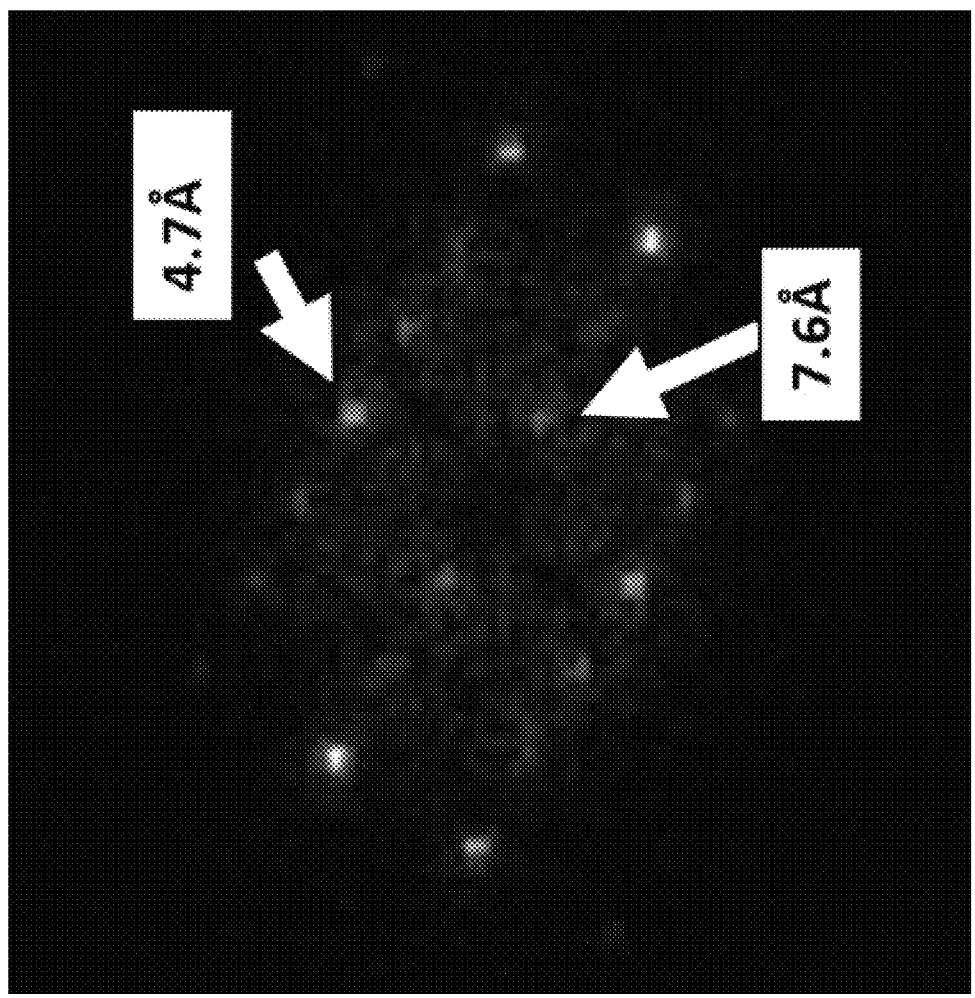
FIG. 1 shows computed Fourier transform amplitudes from the crystals of Example 1, which were used to measure the lattice spacings observed in the transition electron microscope (TEM) image of FIG. 2.
Figure 2:
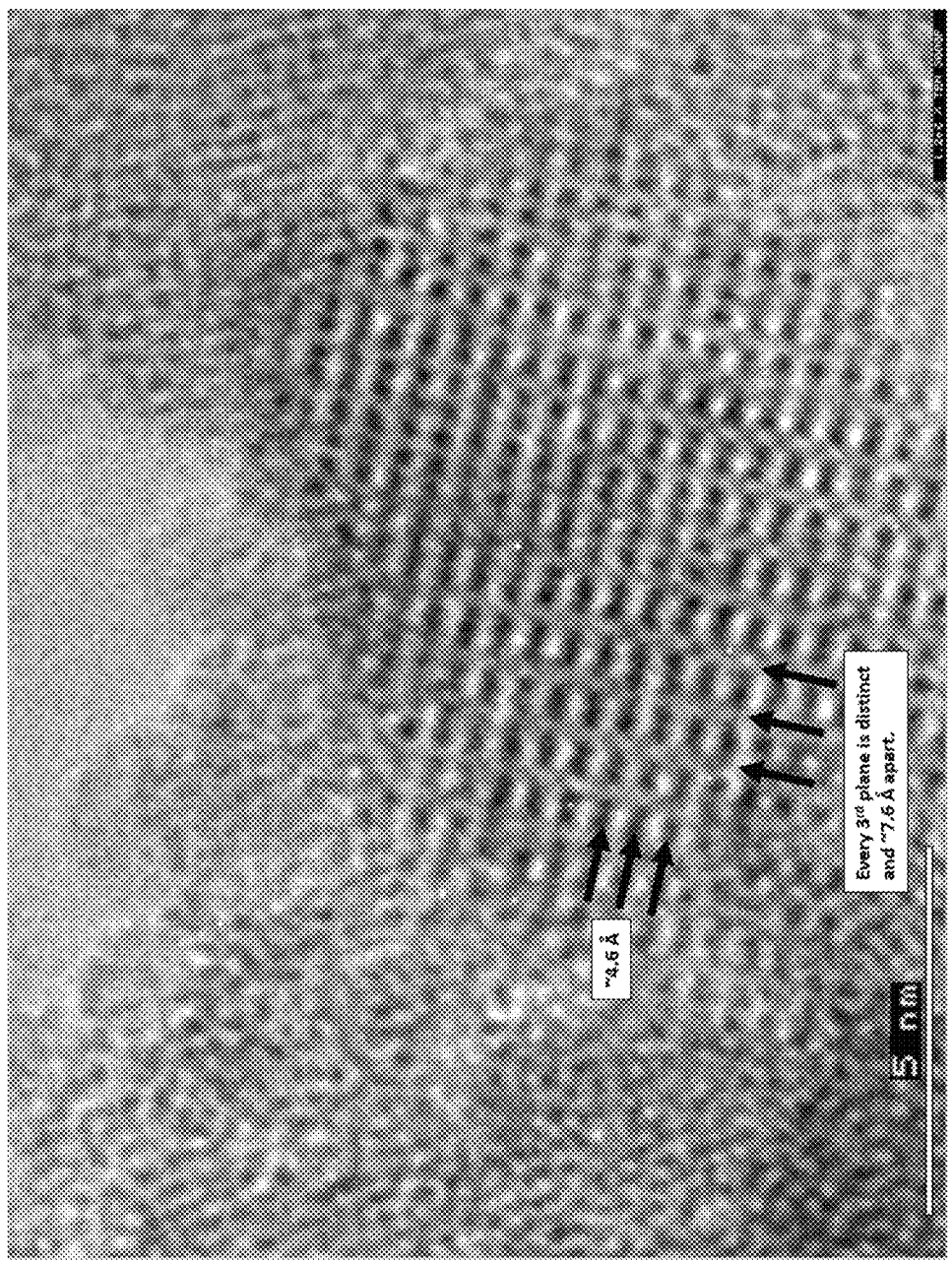
FIG. 2 is a high-resolution transition electron microscope (TEM) showing individual nanocrystals of the crystalline mixed transition metal tungstate prepared in Example 1.
Figure 3:
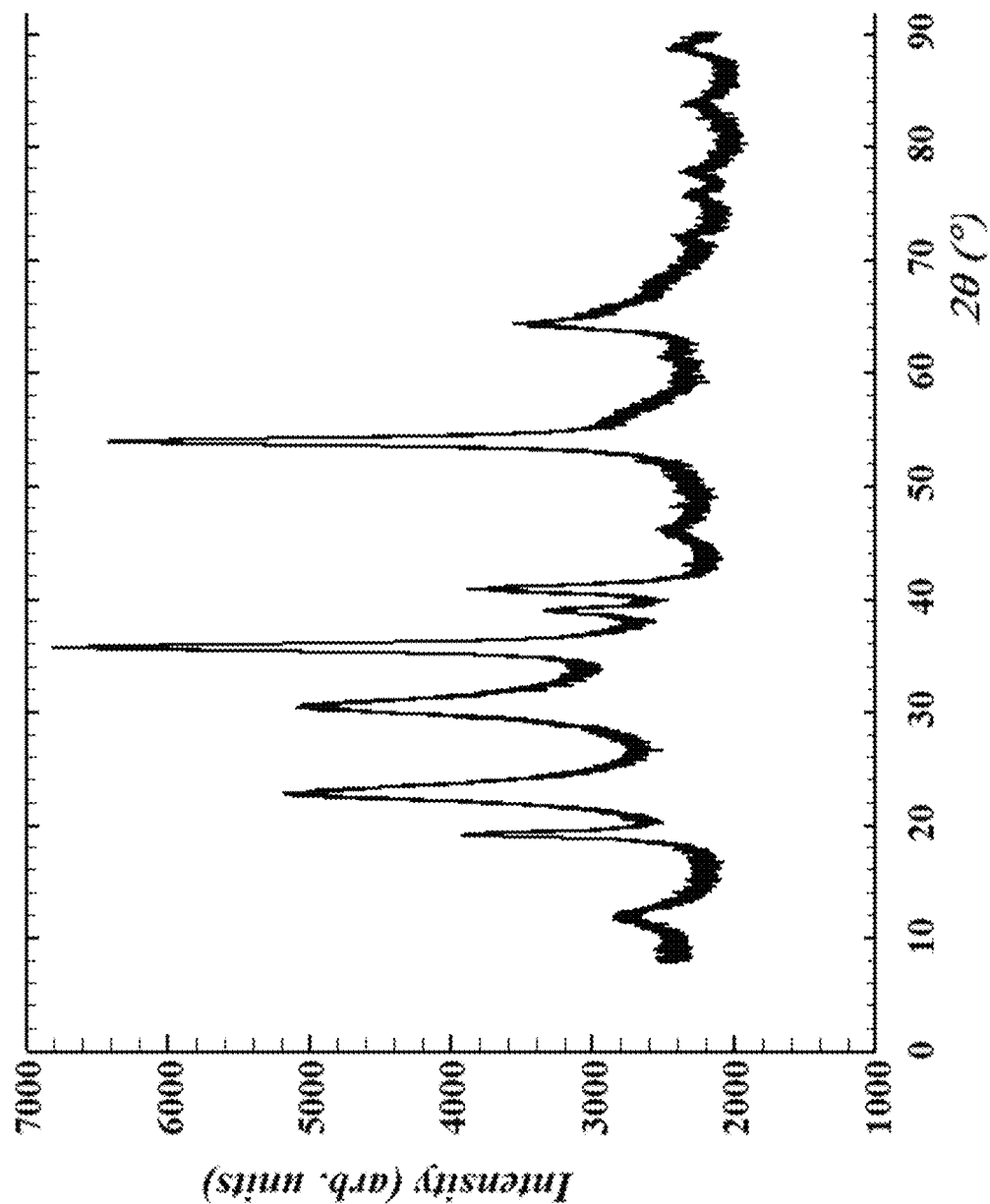
FIG. 3 is the x-ray powder diffraction pattern of a crystalline mixed transition metal tungstate prepared by the method described in the Examples.

The novel crystalline mixed transition metal tungstate composition of the invention is further characterized by the x-ray powder diffraction pattern shown in FIG. 3 and the images in FIG. 1 and FIG. 2

The novel crystalline mixed transition metal tungstate composition can be prepared by solvothermal crystallization of a reaction mixture, typically by mixing reactive sources of nickel and tungsten with the appropriate metal 'M'.

Sources of Ni, W, and M include, but are not limited to, the respective halide, sulfide, acetate, nitrate, carbonate, sulfate, oxalate, thiols, hydroxide salts, and oxides of Ni, W, or M. Specific examples of sources of M include, but are not limited to, manganese nitrate, manganese chloride, manganese bromide, manganese sulfate, manganese carbonate, manganese sulfide, manganese hydroxide, manganese oxide, zirconium nitrate, zirconium oxychloride, zirconium bromide, zirconium sulfate, zirconium basic carbonate, zirconium hydroxide, zirconium oxide, copper nitrate, copper chloride, copper bromide, copper sulfate, copper carbonate, copper acetate, copper oxalate, copper sulfide, copper hydroxide, copper oxide, zinc nitrate, zinc chloride, iron bromide, zinc sulfate, zinc carbonate, zinc acetate, zinc oxalate, zinc sulfide, zinc hydroxide, zinc oxide, and any mixture thereof. Additional specific sources include nickel chloride, nickel bromide, nickel nitrate, nickel acetate, nickel carbonate, nickel hydroxide, cobalt chloride, cobalt bromide, cobalt nitrate, cobalt acetate, cobalt carbonate, cobalt hydroxide, cobalt sulfide, nickel chloride, cobalt oxide, nickel bromide, nickel sulfide, nickel oxide, iron acetate, iron oxalate, iron nitrate, iron chloride, iron bromide, iron sulfate, iron carbonate, iron oxalate, iron sulfide, iron oxide, magnesium chloride, titanium oxide, titanium tetrachloride, vanadium chloride and any mixture thereof. Yet additional sources include, but are not limited to, molybdates, tungstates, thiolmolybdates, and thioltungstates, such as molybdenum trioxide, ammonium dimolybdate, ammonium thiomolybdate, ammonium heptamolybdate, sodium dimolybdate, sodium thiomolybdate, sodium heptamolybdate, potassium dimolybdate, potassium thiomolybdate, potassium heptamolybdate, molybdenum sulfide, tungsten trioxide, tungstic acid, tungsten oxytetrachloride, tungsten hexachloride, hydrogen tungstate, ammonium ditungstate, sodium ditungstate, ammonium metatungstate, ammonium paratungstate, sodium ditungstate, sodium ditungstate, sodium metatungstate, sodium paratungstate, and any mixture thereof.

Generally, the process used to prepare the composition of this invention involves forming a reaction mixture wherein all of the components, such as for example, Ni, M, W, NH$_4$OH and H$_2$O are mixed in solution together. By way of one specific example, a reaction mixture may be formed which in terms of molar ratios of the oxides is expressed by the formula:

'A' represents the molar ratio of 'Ni' and may vary from 0.0001 to 0.9999, or from 0.1 to 0.99, or from 0.5 to 0.9; 'x' is a number which satisfies the valency of 'Ni'; 'M' is selected from the group consisting of iron, cobalt, vanadium, manganese, copper, zinc and mixtures thereof; 'y' is a number which satisfies the valency of 'M'; 'B' represents the molar ratio of 'W' and may vary from 0.3 to 1.5, or from 0.4 to 1.2, or from 0.5 to 1; 'z' is a number which satisfies the valency of 'W'; 'C' represents the molar ratio of 'NH$_3$' and may vary from 0.1 to 100 or from 1 to 50 or from 2.5 to 25; the molar ratio of H$_2$O varies from 1 to 5000, or from 10 to 300, or from 20 to 100.

The pH of the mixture is adjusted to a value of from about 6.5 to about 10 or from about 8.5 to about 10. The pH of the mixture can be controlled through the addition of a base such as NH$_4$OH, quaternary ammonium hydroxides, amines, and the like.

Once the reaction mixture is formed, the reaction mixture is reacted at temperatures ranging from about 90° C. to about 250° C. for a period of time ranging from 30 minutes to around 14 days. In one embodiment, the temperate range for the reaction is from about 90° C. to about 120° C. and in another embodiment the temperature is in the range of from about 130° C. to about 180° C. In one embodiment, the reaction time is from about 2 to about 4 hours, and in another embodiment the reaction time is from about 4 to 7 days. The reaction is carried out under atmospheric pressure or in a sealed vessel under autogenous pressure. In one embodiment, the synthesis may be conducted in an open vessel. The novel crystalline mixed transition metal tungstate compositions are recovered as the reaction product. The recovery may be by decantation, filtration, or centrifugation. The novel crystalline mixed transition metal tungstate compositions are characterized by their unique x-ray powder diffraction pattern as shown in Table A, above, and in FIG. 3. Further analyses are shown in FIG. 1 and in FIG. 2.

In the art of hydrothermal synthesis of metal oxides, it is well known that hydroxide defects occur in metal oxides made by this route, and are located either internally as defects or externally as a result of often large external surface areas that are at least partially hydroxylated. These nonstoichiometric amounts of hydroxide moieties additively, together with the oxide ions, account for the collective valences of the metal ions in the compositions.

Once formed, the novel crystalline mixed transition metal tungstate may have a binder incorporated, where the selection of binder includes but is not limited to, anionic and cationic clays such as hydrotalcites, pyroaurite-sjogrenite-hydrotalcites, montmorillonite and related clays, kaolin, sepiolites, silicas, alumina such as (pseudo) boehimite, gibbsite, flash calcined gibbsite, eta-alumina, zicronica, titania, alumina coated titania, silica-alumina, silica coated alumina, alumina coated silicas and mixtures thereof, or other materials generally known as particle binders in order to maintain particle integrity. These binders may be applied with or without peptization. The binder may be added to the bulk crystalline mixed transition metal tungstate composition, and the amount of binder may range from about 1 to about 30 wt % of the finished catalysts or from about 5 to about 26 wt % of the finished catalyst. The binder may be chemically bound to the novel crystalline mixed transition metal tungstate composition, or may be present in a physical mixture with the novel crystalline mixed transition metal tungstate composition.

The novel crystalline mixed transition metal tungstate composition, with or without an incorporated binder can then be sulfided or pre-sulfided under a variety of sulfidation conditions, these include through contact of The novel crystalline mixed transition metal tungstate composition with a sulfur containing feed as well as the use of a gaseous mixture of H$_2$S/H$_2$. The sulfidation of the novel crystalline mixed transition metal tungstate composition is performed at elevated temperatures, typically ranging from 50 to 600° C., preferably from 150 to 500° C., and most preferably from 250 to 450° C.

At least a portion of the crystalline mixed transition metal tungstate, with or without a binder, or before or after inclusion of a binder, can be sulfided in situ in an application or pre-sulfided to form metal sulfides which in turn are used in an application. The sulfidation may be conducted under a variety of sulfidation conditions such as through contact of the crystalline mixed transition metal tungstate with a sulfiding agent such as sulfur containing stream or feedstream as well as the use of a gaseous mixture of H$_2$S/H$_2$. The sulfidation of the crystalline mixed transition metal tungstate is performed at elevated temperatures, typically ranging from 50 to 600° C., or from 150 to 500° C., or from 250 to 450° C. The sulfiding step can take place at a location remote from other synthesis steps, remote from the location of the application where the crystalline mixed transition metal tungstate will be used, or remote from both the location of synthesis and remote from location of use. The materials resulting from the sulfiding step are referred to as metal sulfides which can be used as catalysts in conversion processes.

As discussed, at least a portion of the crystalline mixed transition metal tungstate of this invention can be sulfided and the resulting metal sulfides used as catalysts in conversion processes such as hydrocarbon conversion processes. Hydroprocessing is one class of hydrocarbon conversion processes in which the crystalline mixed transition metal tungstate, or metal sulfides derived therefrom, is useful as a catalyst. Examples of specific hydroprocessing processes are well known in the art and include hydrodenitrification, hydrodesulfurization, hydrodemetallation, hydrodesilication, hydrodearomatization, hydroisomerization, hydrotreating, hydrofining, and hydrocracking. In one embodiment, a conversion process comprises contacting the crystalline mixed transition metal tungstate with a sulfiding agent to generate metal sulfides which are contacted with a feed stream at conversion conditions to generate at least one product.

The operating conditions of the hydroprocessing processes listed above typically include reaction pressures from about 2.5 MPa to about 17.2 MPa, or in the range of about 5.5 to about 17.2 MPa, with reaction temperatures in the range of about 245° C. to about 440° C., or in the range of about 285° C. to about 425° C. Contact time for the feed the active catalyst, referred to as liquid hour space velocities (LHSV), should be in the range of about 0.1 h$^{-1}$ to about 10 h$^{-1}$, or about 2.0 h$^{-1}$ to about 8.0 h$^{-1}$. Specific subsets of these ranges may be employed depending upon the feedstock being used. For example when hydrotreating a typical diesel feedstock, operating conditions may include from about 3.5 MPa to about 8.6 MPa, from about 315° C. to about 410° C., from about 0.25/h to about 5/h, and from about 84 Nm$^3$ H$_2$/m$^3$ to about 850 Nm$^3$ H$_2$/m$^3$ feed. Other feedstocks may include gasoline, naphtha, kerosene, gas oils, distillates, and reformate.

Examples are provided below so that the invention may be described more completely. These examples are only by way of illustration and should not be interpreted as a limitation of the broad scope of the invention, which is set forth in the appended claims.

High-resolution TEM imaging in the following examples was performed using a JEOL 3000F TEM operated at 300 kV accelerating voltage. Images were recorded on a Gatan US1000 CCD camera. TEM image shown in FIG. 2 shows individual nanocrystals from example 1. FIG. 1 shows computed Fourier transform amplitudes from the crystals, which were used to measure the lattice spacings observed in the TEM image. The uncertainty of these measurements for the instrument and imaging conditions was assessed using the (200) spacing of an oriented gold foil, which was accurate to within 5% of the spacing.

Patterns presented in the following examples were obtained using standard x-ray powder diffraction techniques. The radiation source was a high-intensity, x-ray tube operated at 45 kV and 35 mA. The diffraction pattern from the copper K-alpha radiation was obtained by appropriate computer based techniques. Powder samples were pressed flat into a plate and continuously scanned from 3° and 70° (2θ). Interplanar spacings (d) in Angstrom units were obtained from the position of the diffraction peaks expressed as θ, where θ is the Bragg angle as observed from digitized data. Intensities were determined from the integrated area of diffraction peaks after subtracting background, "$I_0$" being the intensity of the strongest line or peak, and "I" being the intensity of each of the other peaks. As will be understood by those skilled in the art the determination of the parameter 2θ is subject to both human and mechanical error, which in combination can impose an uncertainty of about ±0.4° on each reported value of 2θ. This uncertainty is also translated to the reported values of the d-spacings, which are calculated from the 2θ values. In some of the x-ray patterns reported, the relative intensities of the d-spacings are indicated by the notations vs, s, m, and w, which represent very strong, strong, medium, and weak, respectively. In terms of 100(I/$I_0$), the above designations are defined as:

$w=0.0001\text{-}15$, $m=15\text{-}60$:$s=60\text{-}80$ and $vs=80\text{-}100$

In certain instances the purity of a synthesized product may be assessed with reference to its x-ray powder diffraction pattern. Thus, for example, if a sample is stated to be pure, it is intended only that the x-ray pattern of the sample is free of lines attributable to crystalline impurities, not that there are no amorphous materials present. As will be understood to those skilled in the art, it is possible for different poorly crystalline materials to yield peaks at the same position. If a material is composed of multiple poorly crystalline materials, then the peak positions observed individually for each poorly crystalline materials would be observed in the resulting summed diffraction pattern. Likewise it is possible to have some peaks appear at the same positions within different, single phase, crystalline materials, which may be simply a reflection of a similar distance within the materials and not that the materials possess the same structure.

Example 1

Ammonium metatungstate hydrate (53.28 g, 0.21 moles of W), cobalt hydroxide (8.36 g, 0.09 moles of Co) and nickel nitrate hexahydrate (104.76 g, 0.36 moles of Ni) were dissolved in 1000 ml of DI $H_2O$, concentrated ammonium hydroxide (30%) was added to adjust the pH ~7.5. The solution was transferred to a 2000 ml stainless steel reactor and heated to 150° C. for 3 hours with a stirring rate of 150 rpm. The reaction was held at 150° C. for 7 days after which it was allowed to cool to room temperature. This precipitate was cooled to room temperature, filtered, washed with 90 ml of about 90° C. water and then dried at 100° C. Individual nanocrystals of the dried precipitate are shown in the TEM image of FIG. 2, and FIG. 1 shows computed Fourier transform amplitudes from the crystals, which were used to measure the lattice spacings observed in the TEM image. The X-ray diffraction pattern of the dried precipitate is shown in FIG. 3.

Example 2

Ammonium metatungstate hydrate (87.5 g, 0.347 moles of W) was dissolved in 600 ml of $H_2O$. The pH of the solution was increases to ~pH 10 using concentrated $NH_4OH$. A second solution was prepared by dissolving zinc nitrate hexahydrate (12.8 g, 0.043 moles of Zn) and nickel nitrate hexahydrate (125.7 g, 0.43 moles of Ni) in 600 ml of $H_2O$. The two solutions were mixed together and the pH was adjusted to pH 8 using $NH_4OH$ before being transferred to a 2000 ml stainless steel reactor and heated to 180° C. over a 3 hour period with a stirring rate of 300 rpm. The reaction was held at 180° C. for 24 hrs after which it was allowed to cool to room temperature. This precipitate was cooled to room temperature, filtered, washed with hot water (90° C.) and then dried at 100° C. Individual nanocrystals of the dried precipitate are shown in the TEM image of FIG. 2, and FIG. 1 shows computed Fourier transform amplitudes from the crystals, which were used to measure the lattice spacings observed in the TEM image. The X-ray diffraction pattern of the dried precipitate is shown in FIG. 3.

Example 3

Ammonium metatungstate hydrate (77 g, 0.305 moles of W) was dissolved in 600 ml of $H_2O$. The pH of the solution was increases to ~pH 8.5 using concentrated $NH_4OH$. A second solution was prepared by adding copper chloride (28.9 g, 0.215 moles of Cu) and nickel nitrate hexahydrate (125.7 g, 0.43 moles of Ni) in 600 ml of $H_2O$. The two solutions were mixed together and the pH was adjusted to pH 8 using $NH_4OH$ before being transferred to a 2000 ml stainless steel reactor and heated to 180° C. over a 3 hour period with a stirring rate of 300 rpm. The reaction was held at 180° C. for 24 hrs after which it was allowed to cool to room temperature. This precipitate was cooled to room temperature, separated by centrifugation (10,000 rpm for 15 minutes) and washed with hot water (90° C.) and then dried at 100° C. Individual nanocrystals of the dried precipitate are shown in the TEM image of FIG. 2, and FIG. 1 shows computed Fourier transform amplitudes from the crystals, which were used to measure the lattice spacings observed in the TEM image. The X-ray diffraction pattern of the dried precipitate is shown in FIG. 3.

Example 4

Ammonium metatungstate hydrate (126.25 g, 0.5 moles of W) was dissolved in 600 ml of $H_2O$. The pH of the solution was increases to ~pH 9 using concentrated $NH_4OH$. A second solution was prepared by dissolving zinc nitrate hexahydrate (74.37 g, 0.24 moles of Zn) and nickel nitrate hexahydrate (72.70 g, 0.25 moles of Ni) in 600 ml of $H_2O$. The two solutions were mixed together and the pH was adjusted to pH 8 using $NH_4OH$ before being transferred to a 2000 ml stainless steel reactor and heated to 180° C. over a 3 hour period with a stirring rate of 300 rpm. The reaction was held at 180° C. for 24 hrs after which it was allowed to cool to room temperature. This precipitate was cooled to room temperature, filtered, washed with hot water (90° C.) and then dried at 100° C. Individual nanocrystals of the dried precipitate are shown in the TEM image of FIG. 2, and FIG. 1 shows computed Fourier transform amplitudes from the crystals, which were used to measure the lattice spacings observed in the TEM image. The X-ray diffraction pattern of the dried precipitate is shown in FIG. 3.

EMBODIMENTS

Embodiment 1 is a crystalline mixed transition metal tungstate material having the formula:

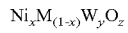
$$Ni_xM_{(1-x)}W_yO_z$$

where 'M' is a metal selected from Mn, Fe, Co, V, Cu, Zn and mixtures thereof; 'x' varies from 0.001 to 2, preferably from 0.01 to 1, and most preferably from 0.1 to 0.5; 'y' varies from 0.3 to 1.2, preferably from 0.45 to 1 and most preferably from 0.5 to 0.9; 'z' is a number which satisfies the sum of the valences of Ni, M, W; the material is further characterized by a unique x-ray powder diffraction pattern showing peaks at the d-spacings listed in Table A:

TABLE A

| d(Å) | I/I$_0$ (%) |
|---|---|
| 7.54 | w-m |
| 4.6 | s |
| 3.87 | s |
| 2.92 | s |
| 2.51 | vs |
| 1.7 | vs |
| 1.63 | m |

The novel crystalline mixed transition metal tungstate material of embodiment 1 wherein the novel crystalline mixed transition metal tungstate material is present in a mixture with at least one binder and wherein the mixture comprises up to 25 wt-% binder.

The novel crystalline mixed transition metal tungstate material of embodiment 1 wherein the novel crystalline mixed transition metal tungstate material is present in a mixture with at least one binder and wherein the mixture comprises up to 25 wt-% binder and wherein the binder is selected from the group consisting of silicas, aluminas, and silica-aluminas.

The novel crystalline mixed transition metal tungstate material of embodiment 1 wherein M is zinc or cobalt.

The novel crystalline mixed transition metal tungstate material of embodiment 1 wherein M is zinc.

The novel crystalline mixed transition metal tungstate material of embodiment 1 wherein the novel crystalline mixed transition metal tungstate material is sulfided.

Embodiment 2 is a method of making a crystalline mixed transition metal tungstate material having the formula:

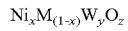
$$Ni_xM_{(1-x)}W_yO_z$$

where 'M' is a metal selected from Mn, Fe, Co, V, Cu, Zn and mixtures thereof; 'x' varies from 0.001 to 2, preferably from 0.01 to 1, and most preferably from 0.1 to 0.5; 'y' varies from 0.3 to 1.2, preferably from 0.45 to 1 and most preferably from 0.5 to 0.9; 'z' is a number which satisfies the sum of the valences of Ni, M, W; the material is further characterized by a unique x-ray powder diffraction pattern showing peaks at the d-spacings listed in Table A:

TABLE A

| d(Å) | I/I$_0$ (%) |
|---|---|
| 7.54 | w-m |
| 4.6 | s |
| 3.87 | s |
| 2.92 | s |
| 2.51 | vs |
| 1.7 | vs |
| 1.63 | m |

The method comprising:
a. forming a reaction mixture containing H$_2$O, M, W and Mo
b. adjusting the pH of the reaction mixture to a pH from around 6.5 to about 10
c. reacting the mixture between 90 and 220° C. in an autogenous environment;
d. recovering the novel crystalline mixed transition metal tungstate material.

The method of embodiment 2 wherein the reacting is conducted at a temperature of from 90° C. to about 220° C. for a period of time from about 30 minutes to 14 days.

The method of embodiment 2 wherein the pH of the reaction mixture is modified by the addition of a base such as NH$_4$OH, quaternary ammonium hydroxides, amines, and the like.

The method of embodiment 2 wherein the recovering is by filtration or centrifugation.

The method of embodiment 2 further comprising adding a binder to the recovered crystalline mixed transition metal tungstate material.

The method of embodiment 2 further comprising adding a binder to the recovered crystalline mixed transition metal tungstate material wherein the binder is selected from the group consisting of aluminas, silicas, and alumina-silicas.

The method of embodiment 2 further comprising sulfiding the recovered crystalline mixed transition metal tungstate material.

Embodiment 3 is a conversion process comprising contacting a feed with a catalyst at conversion conditions to give at least one product, the catalyst comprising: a crystalline mixed transition metal tungstate material having the formula:

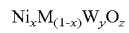
$$Ni_xM_{(1-x)}W_yO_z$$

where 'M' is a metal selected from Mn, Fe, Co, V, Cu, Zn and mixtures thereof; 'x' varies from 0.001 to 2, preferably from 0.01 to 1, and most preferably from 0.1 to 0.5; 'y' varies from 0.3 to 1.2, preferably from 0.45 to 1 and most preferably from 0.5 to 0.9; 'z' is a number which satisfies the sum of the valences of Ni, M, W; the material is further characterized by a unique x-ray powder diffraction pattern showing peaks at the d-spacings listed in Table A:

TABLE A

| d(Å) | I/I$_0$ (%) |
|---|---|
| 7.54 | w-m |
| 4.6 | s |
| 3.87 | s |
| 2.92 | s |
| 2.51 | vs |
| 1.7 | vs |
| 1.63 | m |

The process of embodiment 3 wherein the conversion process is hydroprocessing.

The process of embodiment 3 wherein the conversion process is selected from the group consisting of hydrodenitrification, hydrodesulfurization, hydrodemetallation, hydrodesilication, hydrodearomatization, hydroisomerization, hydrotreating, hydrofining, and hydrocracking The process of embodiment 3 wherein the novel crystalline mixed transition metal tungstate material is present in a mixture with at least one binder and wherein the mixture comprises up to 25 wt-% binder.

The process of embodiment 3 wherein the novel crystalline mixed transition metal tungstate material is sulfided.

The invention claimed is:

1. A crystalline mixed transition metal tungstate material having the formula:

$$Ni_xM_{(1-x)}(OH)_aW_yO_z$$

where 'M' is a metal selected from Mn, Fe, Co, V, Cu, Zn and mixtures thereof; 'x' varies from 0.001 to 0.9999; 'a' varies from 0.001 to 2; 'y' varies from 0.3 to 1.2; 'z' is a number which satisfies the sum of the valences of Ni, M, W; the material is further characterized by a x-ray powder diffraction pattern showing peaks at the d-spacings listed in Table A:

TABLE A

| d(Å) | I/I₀ (%) |
|---|---|
| 7.54 | w-m |
| 4.6 | s |
| 3.87 | s |
| 2.92 | s |
| 2.51 | vs |
| 1.7 | vs |
| 1.63 | m. |

2. The novel crystalline mixed transition metal tungstate material of claim 1 wherein the material is present in a mixture with at least one binder and wherein the mixture comprises up to 25 wt-% binder.

3. The crystalline mixed transition metal tungstate material of claim 2 wherein the binder is selected from silicas, aluminas, and silica-aluminas.

4. The crystalline mixed transition metal tungstate material of claim 1 wherein M is zinc or cobalt.

5. The crystalline mixed transition metal tungstate material of claim 1 wherein M is zinc.

6. The crystalline mixed transition metal tungstate material of claim 1 wherein the crystalline mixed transition metal tungstate material is sulfided.

7. A method of making a crystalline mixed transition metal tungstate material having the formula:

$$Ni_xM_{(1-x)}(OH)_aW_yO_z$$

where 'M' is a metal selected from Mn, Fe, Co, V, Cu, Zn and mixtures thereof; 'x' varies from 0.001 to 0.9999; 'a' varies from 0.001 to 2; 'y' varies from 0.3 to 1.2; 'z' is a number which satisfies the sum of the valences of Ni, M, W; the material is further characterized by a unique x-ray powder diffraction pattern showing peaks at the d-spacings listed in Table A:

TABLE A

| d(Å) | I/I₀ (%) |
|---|---|
| 7.54 | w-m |
| 4.6 | s |
| 3.87 | s |
| 2.92 | s |
| 2.51 | vs |
| 1.7 | vs |
| 1.63 | m | the method comprising:
 a. forming a reaction mixture containing H₂O, M, W and Ni;
 b. adjusting the pH of the reaction mixture to a pH from 6.5 to 10;
 c. reacting the mixture at a temperature from 90° C. and 220° C. in an autogenous environment;
 d. recovering the crystalline mixed transition metal tungstate material.

8. The method of claim 7 wherein the reacting is conducted for a period of time from 30 minutes to 14 days.

9. The method of claim 7 wherein the recovering is by filtration, centrifugation, or decantation.

10. The method of claim 7 further comprising adding a binder to the recovered crystalline mixed transition metal tungstate material.

11. The method of claim 10 wherein the binder is selected from aluminas, silicas, and alumina-silicas.

12. The method of claim 7 further comprising sulfiding at least a portion of the recovered crystalline mixed transition metal tungstate material to generate metal sulfides.

13. A conversion process comprising contacting a material with a sulfiding agent to convert at least a portion of the material to a metal sulfide and contacting the metal sulfide with a feed at conversion conditions to give at least one product, the material comprising:
 a crystalline mixed transition metal tungstate material having the formula:

$$Ni_xM_{(1-x)}(OH)_aW_yO_z$$

where 'M' is a metal selected from Mn, Fe, Co, V, Cu, Zn and mixtures thereof; 'x' varies from 0.001 to 0.9999; 'a' varies from 0.001 to 2; 'y' varies from 0.3 to 1.2; 'z' is a number which satisfies the sum of the valences of Ni, M, W; the material is further characterized by a unique x-ray powder diffraction pattern showing peaks at the d-spacings listed in Table A:

TABLE A

| d(Å) | I/I₀ (%) |
|---|---|
| 7.54 | w-m |
| 4.6 | s |
| 3.87 | s |
| 2.92 | s |
| 2.51 | vs |
| 1.7 | vs |
| 1.63 | m. |

14. The process of claim 13 wherein the conversion process is hydroprocessing.

15. The process of claim 13 wherein the conversion process is selected from hydrodenitrification, hydrodesulfurization, hydrodemetallation, hydrodesilication, hydrodearomatization, hydroisomerization, hydrotreating, hydrofining, and hydrocracking.

16. The process of claim 13 wherein the novel crystalline mixed transition metal tungstate material is present in a mixture with at least one binder and wherein the mixture comprises up to 25 wt-% binder.

* * * * *